No. 811,060. PATENTED JAN. 30, 1906.
H. HAMANN.
TRACTION ENGINE TENDER.
APPLICATION FILED AUG. 24, 1905.
2 SHEETS—SHEET 1.
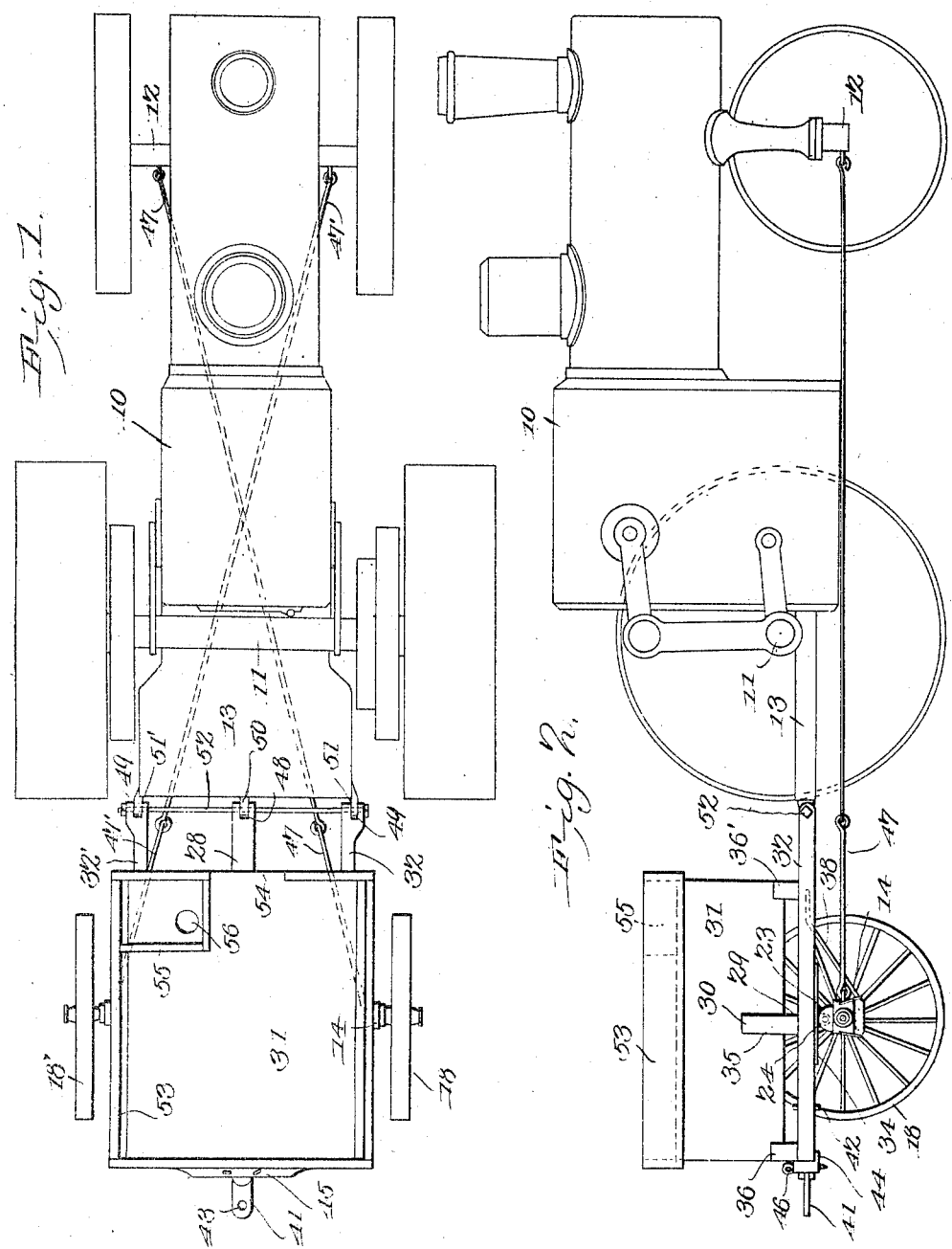
Witnesses
Herman Hamann,
Inventor.
by C. A. Snow & Co
Attorneys

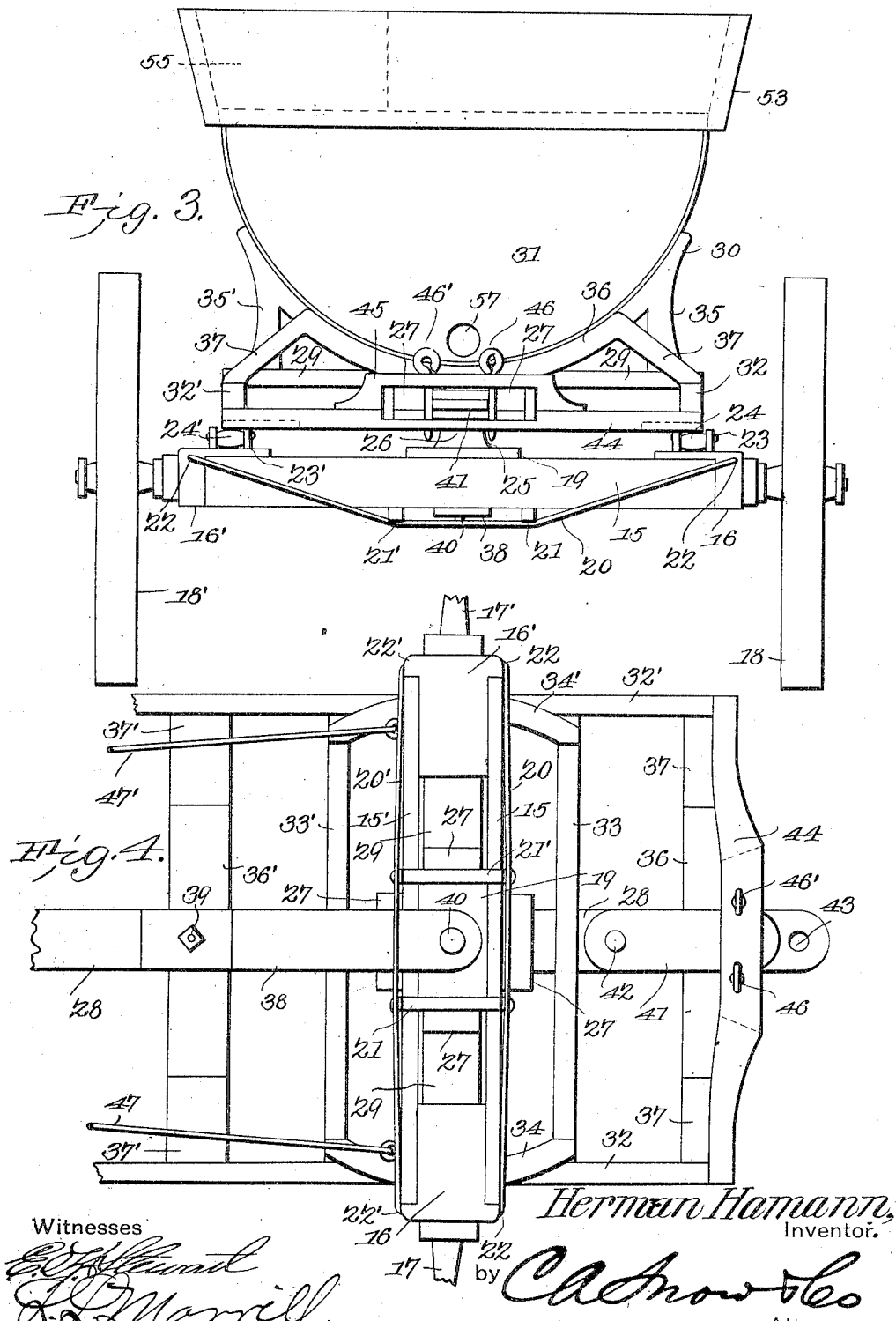

UNITED STATES PATENT OFFICE.

HERMAN HAMANN, OF BEAVERCREEK, MINNESOTA.

TRACTION-ENGINE TENDER.

No. 811,060.

Specification of Letters Patent.

Patented Jan. 30, 1906.

Application filed August 24, 1905. Serial No. 275,660.

*To all whom it may concern:*

Be it known that I, HERMAN HAMANN, a citizen of the United States, residing at Beavercreek, in the county of Rock and State of Minnesota, have invented a new and useful Traction-Engine Tender, of which the following is a specification.

This invention relates to traction-engine tenders, and has for an object to provide a device of the class embodying new and improved features of durability, convenience, utility, and efficiency.

A further object of the invention is to provide a device of the class embodying a tank removably mounted upon two wheels and wherein the weight of the tank and contents is carried over and upon the axle with braces supporting opposite ends to prevent the tank from tipping off the axle.

A further object of the invention is to provide a semicylindrical tank of a form to be cheaply manufactured from sheet metal and which is mounted and carried in a saddle on an axle supported on two wheels and with curved braces supporting each end.

With these and other objects in view the present invention consists in the combination and arrangement of parts as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a top plan view of the improved tender connected with an engine and showing the means for guiding. Fig. 2 is a view of the tender in side elevation connected with a conventional engine. Fig. 3 is a rear end view of the improved tender. Fig. 4 is an inverted plan view of the improved tender vehicle and frame.

Like characters of reference indicate corresponding parts in all of the figures of the drawings.

The tender forming the subject-matter of this application is adapted to be attached to any ordinary traction-engine, shown conventionally at 10 and having the rear axle 11, front axle 12, and platform 13. In its preferred embodiment the improved tender comprises an axle (designated as a whole at 14) and comprising the bars 15 15′, having the blocks 16 16′ clamped between their opposite ends and respectively carrying the spindles 17 17′, upon which are mounted the wheels 18 18′.

Intermediate their ends a hollow bearing-block 19 is clamped between the bars 15 15′, and the middle of the axle is supported by truss-rods 20 20′, engaging cross-pieces 21 21′, spaced upon either side of the middle and having their ends connected to the spindle-blocks, as at 22 22′. Upon and preferably integral with the spindle-blocks are carried the ears 23 23′, between which respectively are journaled the rollers 24 24′.

Within the hollow bearing-block 19 is mounted a ball 25, integral with the standard 26 and head 27. Upon the head 27 is secured the draw-bar 28, extending longitudinally of the vehicle and the cross-beam 29, which is disposed over and parallel with the axle in its normal position. Upon the cross-beam 29 is carried the saddle 30, secured thereto at its middle point and disposed in a plane with the axle 14 and cross-beam 29 and conforming to the convexity of the semicylindrical tank 31.

Extending longitudinally of the vehicle and upon each side of and parallel with the draw-bar are the side bars 32 32′, secured intermediate their ends to the extremities of the cross-beam 29 and with brace-pieces 33 33′, disposed upon opposite sides of and parallel with the cross-beam 29 and secured at their middles to the draw-bar 28 and at their extremities to the side bars 32 32′. To the under sides of the side bars 32 32′ are secured the segmental wear-plates 34 34′, having their opposite ends curved toward the draw-bar and secured to the brace-pieces 33 33′ and bearing upon the rollers 24 24′ and preventing the tipping of the tank. From adjacent the ends of the cross-beam 29 braces 35 35′ rise to and are connected with and support the extremities of the saddle 30.

Upon opposite sides of the saddle 30 are curved supports 36 36′, conforming to and supporting the convex ends of the tank 31 and supported at their extremities by the braces 37 37′, secured to the side bars 32 32′. Adjacent the support 36′ a keeper 38 is secured to the draw-bar 28, as by the bolt 39, and is properly formed to and passes under the axle 14 and is there secured at its pivot-point by the pin 40.

The draw-bar 28 does not extend the entire length of the vehicle, and stopping short of the rear end a link 41 is pivoted thereto as by the pivot-pin 42 and extending rearwardly beyond the lines of the vehicle is provided with an opening 43 to which another vehicle, as a threshing-machine, may be coupled. Between the link 41 is disposed a bar 44, to which is secured a keeper 45, disposed above the link, and pins 46 46' may be inserted through properly-positioned holes upon either side of and to hold the link 41 in alinement with the draw-bar 28. To the forward side of the axle and adjacent its ends rods 47 47' are secured, which extend beneath the engine and are connected with the front axle 12, adjacent its ends, and by which the axle 14 is moved angularly upon the pin 40 and ball 25 to guide the tender. The forward end of the draw-bar 28 is provided with a slot 48 and side bars with slots 49 49' for coupling, respectively, to bars 50 and 51 51' as with pin 52.

The tank is provided about its upper and outer edge with an upstanding flange 53, having an open space 54 in the middle of the forward flange, the flange forming a fuel-box and the opening forming means by which the fuel may be shoveled from the box. In one forward corner of the fuel-box a smaller water-tight box 55 is formed, having an opening 56 formed through the bottom, through which water may be introduced into the tank and also through which suction-hose from the pump or injector may be extended into the tank. The rear end of the tank may be provided with an opening closed by a bung or hand-hole cover 57 and from which sediment or other contents may be discharged.

From the foregoing description it is believed the use, operation, and advantages of the invention will be fully and clearly understood.

Having thus described the invention, what is claimed is—

1. In a traction-engine tender, a wheeled axle, a saddle carried above and upon the axle, a semicylindrical tank mounted and carried intermediate its ends upon and in the saddle, curved supports spaced upon each side of the saddle and conforming to the convexity of the tank and frame-pieces carried upon the axle and supporting the curved supports.

2. In a traction-engine tender, a wheeled axle, a draw-bar, a saddle carried above and upon the axle and disposed in a plane parallel therewith, a semicylindrical tank mounted and carried intermediate its ends upon and in the saddle, frame-pieces extending transversely of the axle and upon each side of and parallel with the draw-bar and curved supports under each end of and conforming to the convexity of the tank and carried upon the frame-pieces and draw-bar.

3. In a traction-engine tender, a wheeled axle, a draw-bar extending transversely of the axle, frame-pieces spaced upon opposite sides of parallel to and connected with the draw-bar, rollers journaled upon the axle and supporting the frame-pieces, a saddle carried above the axle and upon the draw-bar and frame-pieces, a semicylindrical tank mounted and carried intermediate its ends upon and in the saddle and curved supports under each end of and conforming to the convexity of the tank and carried upon the draw-bar and frame-pieces.

4. In a traction-engine tender, a wheeled axle, a draw-bar pivoted upon the axle midway of its ends, a keeper attached to the draw-bar and pivoted to the under side of the axle, rollers journaled upon the axle adjacent the wheels, frame-pieces disposed parallel with and secured to the draw-bar and carried upon the rollers, a saddle disposed over and in a plane parallel with the axle and upon the draw-bar and frame-pieces, and curved supports under each end of and conforming to the convexity of the tank and carried upon the draw-bar and frame-pieces.

In testimony that I claim the foregoing as my own I have hereto affixed my signature in the presence of two witnesses.

HERMAN HAMANN.

Witnesses:
M. O. PAGE,
A. B. LUNDER